US006950985B2

United States Patent
Lee

(12) United States Patent
(10) Patent No.: US 6,950,985 B2
(45) Date of Patent: Sep. 27, 2005

(54) SPECIFYING DICOM SEMANTIC CONSTRAINTS IN XML

(75) Inventor: Kwok Pun Lee, Flushing, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 643 days.

(21) Appl. No.: 10/029,827

(22) Filed: Dec. 27, 2001

(65) Prior Publication Data

US 2004/0205563 A1 Oct. 14, 2004

(51) Int. Cl.[7] .............................................. G08F 17/00
(52) U.S. Cl. ..................................... 715/513; 715/501.1
(58) Field of Search ................................. 715/513, 522, 715/501.1; 382/128; 600/443, 921

(56) References Cited

U.S. PATENT DOCUMENTS

| 5,668,998 | A | 9/1997 | Mason et al. |
| 5,671,353 | A | 9/1997 | Tian et al. |
| 5,835,735 | A | 11/1998 | Mason et al. |
| 6,260,021 | B1 | 7/2001 | Wong et al. |
| 6,644,322 | B2 * | 11/2003 | Webb .......................... 128/899 |
| 6,675,355 | B1 * | 1/2004 | Demopoulos et al. ....... 715/513 |
| 2002/0016718 | A1 * | 2/2002 | Rothschild et al. ............. 705/2 |
| 2002/0023172 | A1 * | 2/2002 | Gendron et al. ............. 709/238 |
| 2003/0037054 | A1 * | 2/2003 | Dutta et al. .................. 707/100 |
| 2003/0208378 | A1 * | 11/2003 | Thangaraj et al. .............. 705/2 |

OTHER PUBLICATIONS

Clunie, David, "DICOM Structured Reporting: An Object MOdel as an Implementation Boundary", ComView Corporation, www.google.com, Jun. 3, 2001.*

Behlen, Fred M., "Introduction to DICOM", HL7 May 2001 Working Group Meeting DICOM Tutorial, www.google.com, May 2001, pp 1–25.*

"Extending XML Schemas" R. Costello, Internet Publication Online!, May 3, 2001, XP002270153, pp. 75–83.

* cited by examiner

Primary Examiner—Joseph Feild
Assistant Examiner—Laurie Anne Ries

(57) ABSTRACT

The invention relates to a method of providing DICOM SR constraints within an XML document. An XML document is created containing DICOM SR constraints using declarative language. The document can then be accessed and displayed if desired.

12 Claims, 2 Drawing Sheets

```
<xsd:element name='patients_name'>                            ~20
<xsd:complexType content='empty">
<xsd:attribute name="CodingScheme" use="fixed" value='DCM"/>
<xsd:attribute name="CodeId" use="fixed"
value=" (0010,0010) " />
<xsd:attribute name="codeMeaning" use="fixed"
value="Patient's Name"/>
<xsd:attribute name="Value" use="required">      ~23
<xsd:simpleType>
<xsd:restriction base="xsd:string">    ~24
<xsd:maxLength value="64" />
</xsd:restriction>                    ~25
</xsd:simpleType>
</xsd:attribute>
</xsd:complexType>
</xsd:element>
                              ~21
```

22 points to the `value="Patient's Name"/>` line. 20 points to the first line.

FIG. 3

SPECIFYING DICOM SEMANTIC CONSTRAINTS IN XML

FIELD OF THE INVENTION

The invention relates to a method and system for providing DICOM constraints within an XML document. Specifically, the present invention is directed to a method and system for modifying XML Schema to allow the native declaration of DICOM constraints within an XML framework without the need to compile or link specialized software.

BACKGROUND OF THE INVENTION

Extensible Markup Language (XML) was first designed as a complete, platform-independent and system-independent environment for the delivery and authoring of information resources over the World Wide Web (hereinafter, "Web"). XML was intended to supplement and in some cases replace Hypertext Markup Language (HTML), which had been the prevalent method of authoring and referencing content over the Web.

XML is a set of technologies that define a universal data format for tree-based, hierarchically formed information. A number of new specifications extending its range and power, such as Extensible Stylesheet Language (XSL), Document Object Model (DOM), and XSL Transformations (XSLT), are being developed or have already been developed. XML offers the advantages of platform independence and Web awareness, and many XML tools are open source and freely available. Thus XML technologies can provide a simple and low cost solution for enterprise-wide access to clinical information including medical reports.

Because XML is used to describe information as well as structure, it is particularly well suited as a data description language. One of XML's particular strengths is that it allows entire industries, academic disciplines, and professional organizations to develop sets of Document Type Definitions (DTDs) and Schemas that can serve to standardize the representation of information within those disciplines. Given a set of DTDs and Schemas, content material that is modeled in conformance with the DTDs and Schemas can be processed by applications that are developed for these DTDs and Schemas.

A further advantage of the use of XML is the wealth of tools that are available for the processing of XML-compatible data. Of particular significance, the "Extensible Stylesheet Language" (XSL) is a language for expressing stylesheets, and the "XSL Transformations" (XSLT) is a language for transforming XML documents into other documents, using stylesheets.

To facilitate a uniform understanding of an XML encoding of medical reports, it is necessary to define a DTD for the reports. A DTD is used to describe the permissible elements and attributes in an XML document, primarily in terms of structures and restrictions of "document-like" objects such as articles and books. Such a DTD has been derived from a Unified Modeling Language (UML) model of the Digital Imaging and Communication in Medicine (DICOM) Structured Reporting (SR) information model. The DICOM SR is based on a relational data technology, and has been standardized by the National Electrical Manufacturers Association (NEMA). *Supplement 23: Structured Reporting Storage SOP Classes* to the DICOM Standard, published by the DICOM Standards Committee, 1300 N. 17th Street, Rosslyn, Va. 22209 USA, and incorporated by reference herein.

The DICOM SR standard, and the SR Documentation Model upon which it is based, improves the expressiveness, precision, and comparability of documentation of diagnostic images and waveforms. DICOM SR supports the interchange of expressive compound reports in which the critical features shown by images and waveforms can be denoted unambiguously by the observer, indexed, and retrieved selectively by subsequent reviewers. Findings may be expressed by the observer as text, codes, and numeric measurements, or via location coordinates of specific regions of interest within images or waveforms, or references to comparison images, sound, waveforms, curves, and previous report information. The observational and historical findings recorded by the observer may include any evidence referenced as part of an interpretation procedure. Thus, DICOM SR supports not only the reporting of diagnostic observations, but the capability to document fully the evidence that evoked the observations. This capability provides significant new opportunities for large-scale collection of structured data for clinical research, training, and outcomes assessment as a routine by-product of diagnostic image and waveform interpretation, and facilitates the pooling of structured data for multi-center clinical trials and evaluations.

Methods and systems have been developed for transforming the DICOM SR specification into a UML model to facilitate an understanding of the DICOM SR by non-DICOM systems analysts and system designers (see copending U.S. patent application "UML MODEL AND XML REPRESENTATIONS OF DIGITAL IMAGING AND COMMUNICATIONS IN MEDICINE STRUCTURED REPORTS (DICOM SR)", Ser. No. 09/686,401, filed 10 Oct. 2000 for Alfredo Tirado-Ramos, Jingkun Hu, and Yasser alSafadi, and incorporated by reference herein.) A conversion system that converts DICOM SR information from the DICOM relational model into an XML representation has been created. By providing a mapping between DICOM SR and XML, the DICOM SR content material can be more easily processed by application programs that are DICOM-specific, such as medical analysis programs, as well as by application programs that are not DICOM-specific, such as routine clerical or data-management programs.

A medical report must satisfy a number of constraints contained in the DICOM SR specification. Constraints can take the form of specifying the maximum and minimum values for a given field or requiring a field to be present if some other field has certain values. Document Type Definitions (DTDs), as used in XML documents, unfortunately are extremely limited in their capability to specify these constraints conveniently. Constraints can be expressed with a general purpose programming language such as C or Java. However, since these languages are procedural in nature, code will have to be compiled, linked and executed in order to check the constraints. This departs from the declarative nature of an XML document.

XML Schema, recently approved as a Recommendation from the Worldwide Web Consortium (W3C), allows rich structure and data type definition (among others) in XML documents, providing more expressive power. "Rich structure" refers to an abundance of detail regarding the attributes and constraints of the fields encoded. Copending U.S. patent application Ser. No. 09/818,716"DICOM XML DOCUMENT TYPE DEFINITION (DTD) AND SCHEMA GENERATOR", filed 27 Mar. 2001 for Jingkun Hu, and Kwok Pun Lee, discloses a system and method that facilitate the creation of XML Document Type Definitions ("DTDs") and XML Schemas that correspond to the DICOM SR standard.

It is relatively straightforward to express constraints involving a single element of a DICOM information object definition (IOD) with XML Schema. For example the maximum length of a string can be easily constrained. An example of how this can be done is explained later. However, the definition of an IOD also has a number of constraints that cannot be easily expressed with Schema. In particular those involving multiple elements in an IOD such as a constraint that says an element must be present if another element has a specified value.

Thus, there is a need for a way to express these constraints using the same XML syntax in a declarative manner, using tools such as the Schematron, which was designed to extend the expressive power of XML Schema in specifying constraints. Schematron is a declarative assertion language using XML syntax developed by Rick Jelliffe, a member of the W3C XML Schema Working Group, and consists of a set of rules using XPath expressions, another W3C Recommendation, that can be used to specify relationships between different elements. It is rule-based in contrast to XML Schema, which is grammar-based. Schematron has radically different strengths to XML Schema and is in fact highly complementary.

A set of Schematron rules is written to express constraints that cannot otherwise be specified with XML Schema. This set of rules is transformed automatically through a meta-stylesheet to produce an XSLT stylesheet which can then be run against a given XML document to ensure that the constraints are satisfied. This is a well-known procedure and tools are available to perform this step.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and described, the invention includes a method of providing constraints for digital images and communications in medicine. First, the declarative constraint information is placed within a declarative data block describing a media document. Then, the declarative constraint information is processed as declarative data when the document is accessed.

In another embodiment, a method of providing DICOM constraints within an XML document is included. First, an XML document containing DICOM constraints using declarative language is created. Then a user to is allowed to access the XML document.

The invention also includes a system for specifying constraints for digital images and communications in medicine. The system includes a memory with a document in electronic form with declarative constraint instructions, and a computer processor operatively coupled with the memory and a display device. The processor is configured to execute declarative constraint instructions in the document and display the document on the display device.

It is understood that both the foregoing general description and the following detailed description are exemplary and are intended to provide further explanation of the invention claimed.

The accompanying drawings, which are incorporated in and constitutes part of this specification, are included to illustrate and provide a further understanding of the method and system of the invention. Together with the description, the drawings serve to explain the principles of the invention.

BRIEF DESCRIPTION OF DRAWINGS

FIG. 3 is an example script listing using XML to specify the DICOM constraint to require that a patient's name must not exceed 64 characters in accordance with a preferred embodiment of the current invention.

DETAILED DESCRIPTION OF THE PREFERRED EMBODIMENTS

The following description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

In accordance with a preferred embodiment of the invention, a method of specifying constraints for digital images and communications in medicine, and for supporting DICOM constraints within an XML declarative structure without having to download and run ancillary applets is provided.

Advantageously, the system and method involves supporting namespaces within an XML declarative structure.

Another embodiment of the current invention advantageously allows for expressing DICOM constraints using existing XML tools.

The present invention also advantageously allows the expression of DICOM constraints using standard XML-type syntax in a declarative manner, using tools such as the Schematron, which was designed to extend the expressive power of XML Schema in specifying constraints.

Advantageously, the current invention also provides an approach that is generally applicable and can be used to specify constraints in DICOM IODs other than SR.

Figure 1:
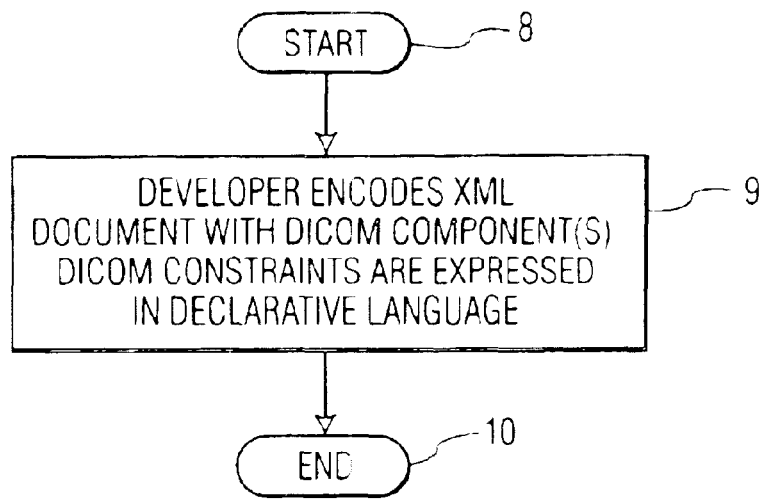
FIG. 1 is a flowchart of a representative process for preparing an XML document with DICOM components for a typical user in accordance with a preferred embodiment of the current invention.

FIG. 1 is a flowchart of a representative process for preparing an XML document for encoding DICOM components for a typical user in accordance with another embodiment of the current invention. Typically, the document developer encodes the DICOM constraints in such an XML document 9. This is accomplished by placing declarative constraint information within an XML Schema for the XML document, thus allowing the declarative constraint information to be processed as declarative data when the document is validated. No further coding development is necessary. An example is to constrain a patient's name to have no more than 64 characters. This can be done by the Schema definition displayed in FIG. 3. Another example is to specify that the value of a patient's age must be 3 digits followed by one of the characters 'D' (Day), 'W' (Week), 'M' (Month) or 'Y' (Year). This approach works well if the constraint involves only a single element.

Figure 2:
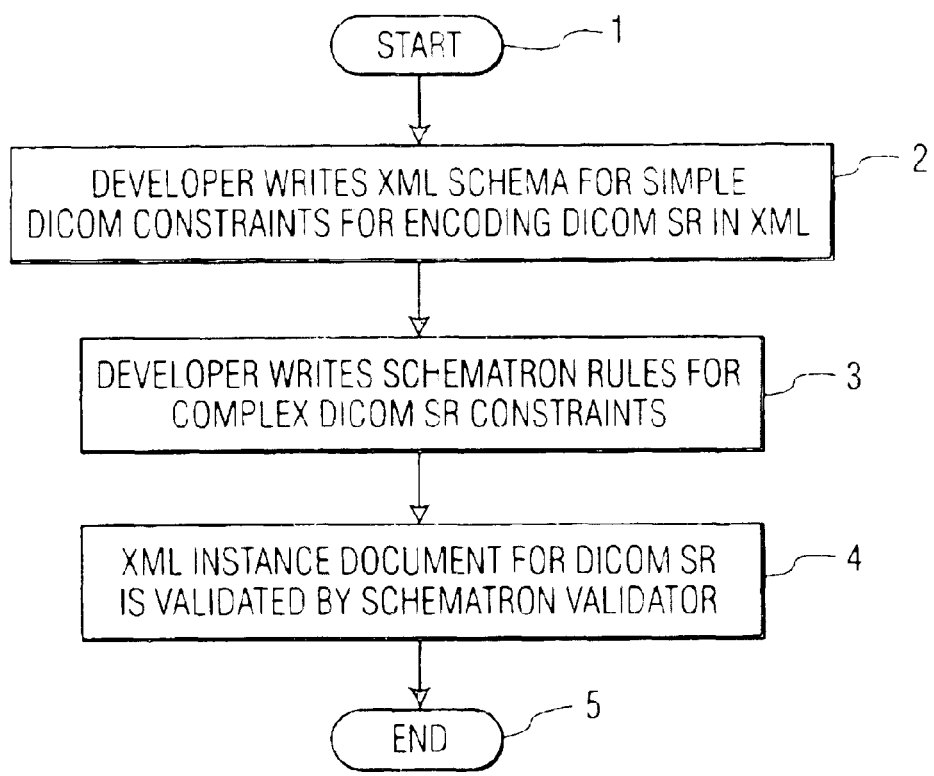
FIG. 2 is a flowchart of a representative process for rendering an XML document with DICOM SR components for a typical user in accordance with a preferred embodiment of the current invention.

FIG. 2 is a flowchart of a representative process for preparing an XML document to encode DICOM components for a typical user in accordance with a preferred embodiment of the current invention. In accordance with this embodiment, the user initiates the procedure 1 by writing an XML Schema for simple DICOM constraints for encoding DICOM SR in XML 2. Next the developer writes Schematron rules for complex DICOM constraints 3. Consider the case of the Verification Flag as an example. Section C.17.2 of the DICOM SR Specification defines the elements of the SR Document General Module. One of the elements is the Verifying Observer Sequence (0040, A073) and is of type 1C which means that it is required to be present under certain conditions. In this case the condition is that another element Verification Flag (0040, A493) has the value 'VERIFIED'. This constraint is expressed in Schematron as follows:

```
<sch:pattern name="SR Document General Module.">
    <sch:rule context="sr_document_general_module">
        <sch:report test="(verification_flag = 'VERIFIED') and (not (verifying_observer_sequence))">Verifying Observer Sequence required if Verification Flag = VERIFIED</sch:report>
    </sch:rule>
</sch:pattern>
```

Where the "sch:report test" element indicates that the Verification Flag must be set to 'VERIFIED' as the constraint. This rule is applied in the context of the SR Document General Module and tests for the value of the element verification_flag being 'VERIFIED' and the presence of the verifying_observer_sequence element. This rule, together with others, are transformed using standard tools into a stylesheet that can be used to check an XML document claiming to be a DICOM SR. An error message is produced if this condition is not satisfied.

Another example is the constraint on the Root Content Item of the SR Document Content Module. Section C.17.3 states that the root Content Item (which is the root of the SR Document tree) must be of type CONTAINER. (There may be many more Content Items, but only the root one must be of this type.) The following Schematron rule enforces this constraint.

```
<sch:pattern name="Check Root Content Item Type." id="SRDocumentContentRoot">
    <sch:rule context="sr_document_content_module">
        <sch:assert test="document_content_macro/value_type = 'CONTAINER'">Root Content Item must be of type CONTAINER</sch:assert>
    </sch:rule>
</sch:pattern>
```

This rule is applied in the context of the SR Document Content Module. The root Content Item is the child of this module. The "sch:assert test" element indicates that the value_type element of this child (document_content_macro) must have the value 'CONTAINER.'

A third example is a Content Sequence Item where the relationship between the (enclosing) Source Content Item and the Target Content Item is by-reference, indicated by the presence of the Referenced Content Item Identifier. The constraint is that in such a case both the Document Relationship Macro and the Document Content Macro shall not be present. This is expressed by the following Schematron rule:

```
<sch:pattern name="By-Reference Target Content Item."
   id="ByReferenceTargetContentItem">
      <sch:rule
context="content_sequence_item/referenced_content_item_identifier">
         <sch:report test="(../document_relationship_macro) or
(../document_content_macro) ">Document Relationship Macro and Document
Content Macro shall not be present if the relationship is by-reference.</sch:report>
      </sch:rule>
   </sch:pattern>
```

This rule is applied in the context of a referenced_content_item_identifier element which is a child of a content_sequence_item element. The presence of the referenced_content_item_identifier element indicates a by-reference relationship. The "<sch:report test" element ensures that the same content_sequence_item element does not also have either a document_relationship_macro element or a document_content_macro element as a child.

Further complex constraints can be similarly expressed with Schematron rules.

An XML document intended to encode DICOM SR can be validated against simple constraints expressed in XML Schema as well as complex constraints expressed as Schematron rules with the use of a Schematron validator 4, which is freely available.

Referring now the FIG. 3, another use of XML to define a constraint is shown. The first line 20 of the XML script identifies the data element name of the element being defined as "patients_name". The "xsd:element name=" of this line indicates the start of the script block wherein the data element "patients_name" is defined. Henceforth, other scripts within the system may refer to this element by its element name. The "/xsd:element" line 21 defines the end of the definition block. The line beginning "xsd:attribute name=" at 22 sets the character string value, or "attribute name" which the element is displayed as, here "Patient's name". Note that the attribute name and data element name are not necessarily the same.

The "xsd:restriction base="line 24 sets the type of data element being defined. In this case, patients_name is a "xsd:string" element type. The next line 25 sets the maximum length of the patients_name element to 64 (characters) with the "xsd:maxLength value=" declaration.

It will be apparent to those skilled in the art that various modifications and variations can be made in the method and system of the present invention without departing from the spirit and scope of the invention. Thus, it is intended that the present invention include modifications and variations that are within the scope of the appended claims and their equivalents.

What is claimed is:

1. A method of providing constraints, the method comprising the steps of:

placing declarative constraint information within a declarative data block describing an electronic document; and processing, by a processor, the declarative constraint information as declarative data when the document is accessed, wherein the constraints are in Digital Imaging and Communication in Medicine (DICOM) Structured Reporting (SR) format.

2. The method of claim 1, wherein the declarative data block is in Extensible Markup Language (XML).

3. The method of claim 1, wherein the constraint provided is that an element be present.

4. The method of claim 1, wherein the constraint provided is that an element be of a specified element type.

5. The method of claim 1, wherein the constraint provided is that two or more elements be in a specific sequence.

6. A method of providing Digital Imaging and Communication in Medicine (DICOM) Structured Reporting (SR) constraints within an XML document, the method comprising the steps of:

creating an XML document containing DICOM SR constraints using declarative language; and providing a processor operable by a user to access the XML document.

7. A system for specifying constraints for digital images and communications in medicine, the system comprising:

a memory with a document in electronic form with declarative constraint instructions; and a computer processor operatively coupled with the memory and a display device, the processor configured to execute declarative constraint instructions in the document, display the document on the display device, wherein the declarative constraint instructions are in Digital Imaging and Communication in Medicine (DICOM) Structured Reporting (SR) format.

8. The system of claim 7, wherein the processor is further configured to store a declarative data block describing the document including the declarative constraint instructions to a data storage operated by the processor.

9. The system of claim 7, wherein the document is in Extensible Markup Language (XML).

10. The system of claim 7, wherein the constraint is that an element be present.

11. The system of claim 7, wherein the constraint is that an element be of a specified element type.

12. The system of claim 7, wherein the constraint is that two or more elements be in a specific sequence.

* * * * *